(12) United States Patent
Puentes et al.

(10) Patent No.: US 10,803,755 B2
(45) Date of Patent: Oct. 13, 2020

(54) VEHICLE OPERATION INSTRUCTION CONFIRMATION

(71) Applicant: THE BOEING COMPANY, Chicago, IL (US)

(72) Inventors: Antonio F. Puentes, Düsseldorf (DE); Melissa I. Blackstun, Darmstadt (DE); Samantha A. Schwartz, Castle Pines, CO (US)

(73) Assignee: THE BOEING COMPANY, Chicago, IL (US)

( * ) Notice: Subject to any disclaimer, the term of this patent is extended or adjusted under 35 U.S.C. 154(b) by 40 days.

(21) Appl. No.: 15/187,468

(22) Filed: Jun. 20, 2016

(65) Prior Publication Data

US 2017/0365177 A1 Dec. 21, 2017

(51) Int. Cl.
| G06F 17/00 | (2019.01) |
| G08G 5/00 | (2006.01) |
| G08G 5/02 | (2006.01) |
| B64D 43/00 | (2006.01) |
| B64D 45/00 | (2006.01) |
| G07C 5/08 | (2006.01) |

(52) U.S. Cl.
CPC ........... *G08G 5/0021* (2013.01); *B64D 43/00* (2013.01); *B64D 45/00* (2013.01); *G07C 5/0825* (2013.01); *G08G 5/0013* (2013.01); *G08G 5/0039* (2013.01); *G08G 5/0052* (2013.01); *G08G 5/0065* (2013.01); *G08G 5/0091* (2013.01); *G08G 5/025* (2013.01); *B64D 2045/0075* (2013.01)

(58) Field of Classification Search
CPC .... G08G 5/0021; G08G 5/0013; B64D 43/00; B64D 45/00; B64D 2045/0075; G07C 5/0825
USPC ......................................................... 701/120
See application file for complete search history.

(56) References Cited

U.S. PATENT DOCUMENTS

| 8,140,358 B1 * | 3/2012 | Ling | G06Q 40/08 |
| | | | 705/4 |
| 9,129,460 B2 * | 9/2015 | McClellan | G07C 5/008 |

(Continued)

FOREIGN PATENT DOCUMENTS

| EP | 2159544 A1 | 3/2010 |
| EP | 2234087 A1 | 9/2010 |

(Continued)

OTHER PUBLICATIONS

Extended European Search Report for Application 17164659.9-1803 dated Oct. 17, 2017.

*Primary Examiner* — Ronnie M Mancho
(74) *Attorney, Agent, or Firm* — Patterson + Sheridan, LLP

(57) ABSTRACT

A method, system, and computer program product for providing an indication that a received vehicle operation instruction can be performed is provided. During operation of a vehicle a vehicle operation instruction is received and at least one vehicle performance parameter to perform the vehicle operation instruction is calculated. Then, a determination is made as to whether the calculated at least one vehicle performance parameter exceeds performance limitations of the vehicle. If at least one performance parameter exceeds a performance limitation, then a first alert is generated and output.

20 Claims, 4 Drawing Sheets

(56) References Cited

U.S. PATENT DOCUMENTS

| | | | |
|---|---|---|---|
| 2004/0153362 A1* | 8/2004 | Bauer | G06Q 40/02 705/4 |
| 2005/0004723 A1* | 1/2005 | Duggan | G05D 1/0061 701/24 |
| 2007/0215745 A1 | 9/2007 | Fleury et al. | |
| 2008/0252487 A1* | 10/2008 | McClellan | G01S 5/0027 340/936 |
| 2008/0294690 A1* | 11/2008 | McClellan | G01S 5/0027 |
| 2009/0051510 A1* | 2/2009 | Follmer | G07C 5/008 340/425.5 |
| 2011/0176428 A1* | 7/2011 | Ballard | B60R 16/03 370/241 |
| 2011/0254676 A1* | 10/2011 | Marumoto | G07C 5/008 340/441 |
| 2013/0231848 A1* | 9/2013 | Roberts | F02N 11/0807 701/112 |
| 2014/0162219 A1* | 6/2014 | Stankoulov | G09B 19/167 434/65 |
| 2014/0188344 A1* | 7/2014 | Lavoie | B60W 30/00 701/41 |
| 2014/0267689 A1* | 9/2014 | Lavoie | H04N 7/183 348/113 |
| 2014/0278038 A1* | 9/2014 | Stankoulov | G01C 21/3469 701/123 |
| 2014/0306799 A1* | 10/2014 | Ricci | H04W 4/21 340/5.83 |
| 2014/0306826 A1* | 10/2014 | Ricci | H04W 4/21 340/573.1 |
| 2015/0070178 A1* | 3/2015 | Kline | G08B 21/02 340/576 |
| 2016/0039456 A1* | 2/2016 | Lavoie | B62D 15/027 701/41 |
| 2016/0086393 A1* | 3/2016 | Collins | G06Q 40/08 701/31.5 |
| 2016/0357262 A1* | 12/2016 | Ansari | G06F 3/017 |
| 2016/0358477 A1* | 12/2016 | Ansari | G08G 1/167 |

FOREIGN PATENT DOCUMENTS

| | | |
|---|---|---|
| EP | 2717018 A2 | 4/2014 |
| EP | 2955707 A2 | 12/2015 |
| EP | 3018646 A1 | 5/2016 |

\* cited by examiner

VEHICLE OPERATION INSTRUCTION CONFIRMATION

BACKGROUND

Air traffic controllers issue instructions to pilots of aircraft on the ground and in the air so that aircraft operations are within parameters and orderly. In some instances, air traffic controllers use controller pilot data link communication (CPDLC) systems to provide text-based instructions to aircraft. In some circumstances, speech-to-text software can convert a spoken instruction into a text-based instruction.

When pilots receive instructions, spoken or text-based, the pilots are expected to quickly respond to air traffic control instructions and indicate whether the aircraft will comply with the instructions. The pilots therefore have a limited period of time, often no more than a few seconds, to determine whether the instructions can be followed within parameters.

SUMMARY

According to one aspect, a computer-implemented method comprises receiving a vehicle operation instruction during operation of a vehicle. The method also includes calculating at least one vehicle performance parameter to perform the vehicle operation instruction. The method also includes determining whether the calculated at least one vehicle performance parameter exceeds performance limitations of the vehicle. The method also includes generating and outputting a first alert upon determining that the calculated at least one vehicle performance parameter exceeds a performance limitation from among the performance limitations of the vehicle.

According to one aspect, a system for an aircraft comprises a controller pilot data link communications (CPDLC) module. The system also comprises a computer processor. The system also comprises a computer memory that includes a data structure including performance limitations for the aircraft. The computer memory also includes an application that is executable on the computer processor to receive an aircraft operation instruction from the CPDLC module. The application is also executable to calculate at least one aircraft performance parameter to perform the aircraft operation instruction. The application is also executable to determine whether the calculated at least one aircraft performance parameter exceeds performance limitations of the aircraft. The application is also executable to generate and output a first alert to a computer display screen upon determining that the calculated at least one aircraft performance parameter exceeds a performance limitation from among the performance limitations of the aircraft.

According to one aspect, a computer program product for clearing vehicle operation instructions is provided. The computer program product comprises a computer-readable storage medium having computer-readable program code embodied therewith. The computer-readable program code executable by one or more computer processors to receive a vehicle operation instruction during operation of a vehicle. The computer-readable program code is further executable to calculate at least one vehicle performance parameter to perform the vehicle operation instruction. The computer-readable program code is further executable to determine whether the calculated at least one vehicle performance parameter exceeds performance limitations of the vehicle. The computer-readable program code is further executable to generate and output a first alert upon determining that the calculated at least one vehicle performance parameter exceeds a performance limitation from among the performance limitations of the vehicle.

DETAILED DESCRIPTION

Figure 1:
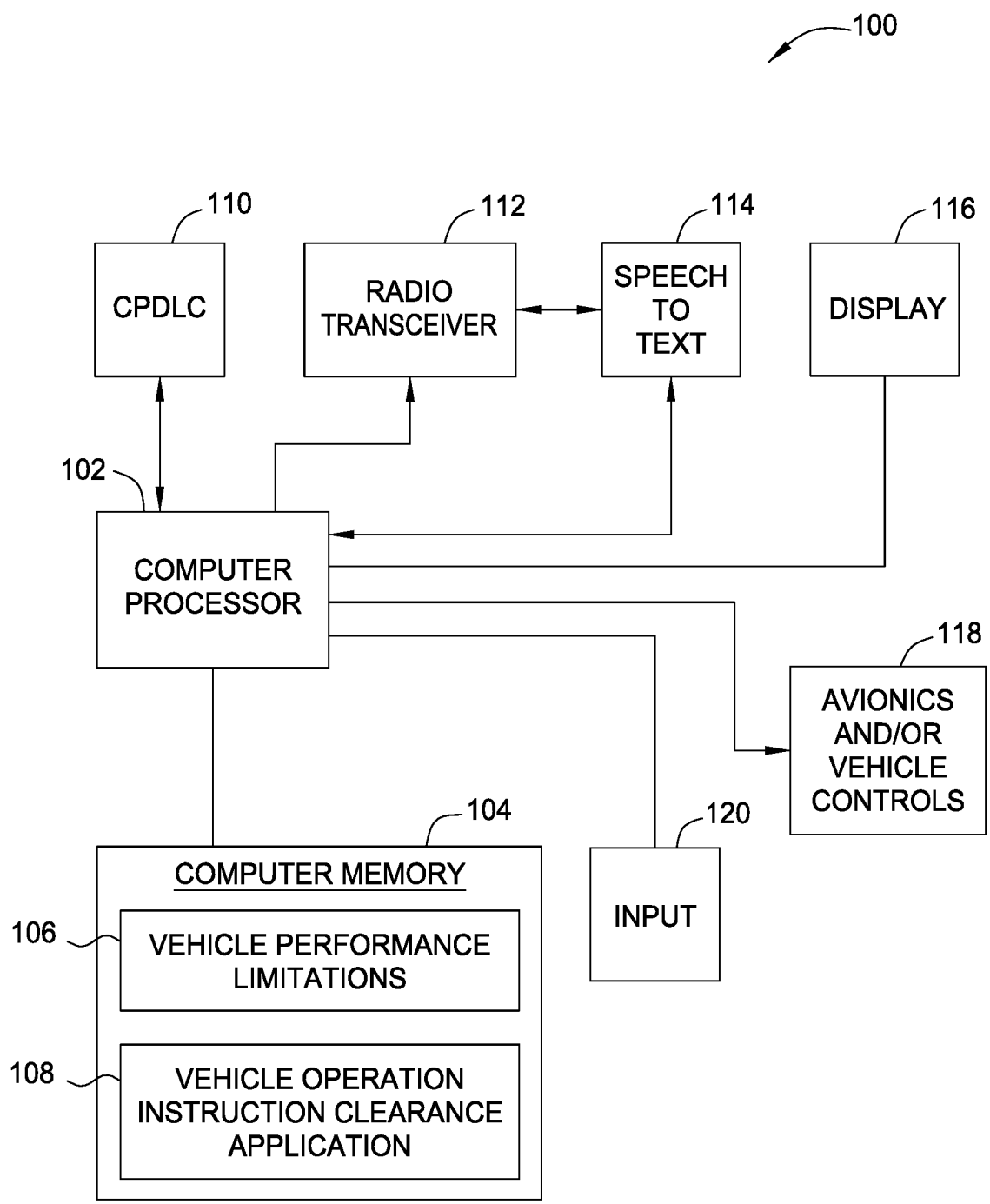
FIG. 1 is a block diagram of a system, according to one aspect, for providing text-based vehicle direction confirmation.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Certain vehicle operations are governed by centralized traffic controllers. For example, aircraft movements are often governed by air traffic controllers who typically provide spoken word instructions via radio communication with pilots of various aircraft. In certain circumstances, the air traffic controllers can issue instructions via a controller pilot data link communication (CPDLC) system that provides text-based instructions to a computer display screen on the flight deck of an aircraft. The pilots of the aircraft are expected to quickly reply to the instruction, indicating that the aircraft will or will not comply with the instruction from the air traffic controller. The brief period of time between an air traffic controller issuing an instruction and the pilot's response may not provide sufficient time for the pilots to determine that the aircraft can perform the instructions. For example, the air traffic controller may instruct an aircraft to land on a particular runway and come to a stop before reaching a certain crossing taxiway. However, the aircraft may be too heavy and/or going too fast to be able to stop on the amount of runway available before reaching the designated taxiway. In aspects described herein, vehicle performance parameters to perform an instruction from a vehicle controller (e.g., an air traffic controller) are calculated. The vehicle performance parameters are compared to performance limitations of the vehicle to determine whether the vehicle performance parameters exceed performance limitations of the vehicle. In the event the vehicle performance parameters exceed a performance limitation of the vehicle, an alert can be generated and provided to the vehicle operator. In the even the vehicle performance parameters do not exceed a performance limitation of the vehicle, the vehicle operator can be provided with an indication. Additionally, the vehicle may be automatically controlled to comply with the instruction.

FIG. 1 is a block diagram illustrating a system 100 according to at least one aspect for an aircraft. The system 100 includes a controller pilot data link communication (CPDLC) system 110 that can receive text-based air traffic control instructions. Such text-based air traffic control instructions could include taxi instructions for aircraft on the ground and moving about an airport, for example. Such text-based air traffic control instructions could also include instructions for aircraft to take off, land, change altitude, change heading, change speed, and change radio frequencies, for example. In various aspects, the CPDLC module 110 can also transmit text-based messages to the air traffic controllers. For example, the CPDLC module 110 could transmit a "will comply" message, a "will not comply" message, and/or a "will not comply" message accompanied with a proposed modified instruction.

As discussed above, many air traffic control instructions are provided via spoken word instructions transmitted over a radio. The system 100 could include a radio transceiver 112 that can receive and transmit such spoken instructions and spoken responses. The radio transceiver 112 could be a very high frequency (VHF) radio, for example. The system 100 can include a speech-to-text module 114 that can receive spoken instructions from the radio transceiver 112 and convert the spoken instructions to text. In various aspects, the speech-to-text module 114 can also convert a text-based automated response generated by the system into a spoken response that can be transmitted via the radio transceiver 112 to an air traffic controller.

The system 100 can also include a display 116 that can display text-based instructions received via the CPDLC module 110 and/or text instructions from the speech-to-text module 114. As discussed in greater detail below, the display 116 can also display a graphical user interface that can provide to the user an indication of whether a received air traffic control instruction exceeds any performance limitations of the aircraft. In various aspects, the display 116 can also display a graphical user interface that enables a user to approve and transmit automatically generated responses to text-based instructions received by the CPDLC module 110 and/or by the speech-to-text module 114. In at least one aspect, the display 116 could be a display on a personal electronic device, such as a tablet computer or laptop. In at least one aspect, the display 116 could be a display of an electronic flight bag, such as an electronic flight bag system incorporated into an aircraft flight deck.

The system 100 also includes a computer processor 102 in communication with the CPDLC module 110, the radio transceiver 112, and/or the speech-to-text module 114. The system 100 also includes the computer memory 104. The computer memory 104 stores vehicle performance limitations 106. In the context of an aircraft, vehicle performance limitations 106 could include airspeed limitations, altitude limitations (e.g., maximum altitude at different aircraft weights), and maneuvering limitations (e.g., maximum G loads). The vehicle performance limitations 106 could also include temporary restrictions, such as minimum equipment list restrictions (i.e., performance restrictions resulting from inoperative equipment) and maintenance restrictions.

The computer memory 104 also stores a vehicle operation instruction clearance application 108. The vehicle operation instruction clearance application 108 is executable by the computer processor 102 to analyze a text-based instruction received via the CPDLC module 110 and/or via the speech-to-text module 114 to identify vehicle performance parameters to perform the text-based instruction. The vehicle operation instruction clearance application 108 also compares the identified vehicle performance parameters to the vehicle performance limitations 106 to determine whether the identified vehicle performance parameters exceed any of the vehicle performance limitations 106. The vehicle operation instructions clearance application 108 also provides a graphical indication on the display 116 to inform the pilots whether the air traffic control instruction exceeds any vehicle performance limitations 106. For example, the graphical indication on the display 116 could be a green-colored field in the event that none of the vehicle performance limitations 106 are exceeded by the identified vehicle performance parameters. As another example, the graphical indication on the display 116 could be a red-colored field in the event that one or more of the vehicle performance limitations 106 are exceeded by the identified vehicle performance parameters. As another example, the graphical indication on the display 116 could be a yellow-colored field in the event that it is unclear whether any of the vehicle performance limitations 106 are exceeded by the identified vehicle performance parameters. As another example, the graphical indication of the display 116 could be a yellow-colored field in the event that certain criteria need to be met for the identified vehicle performance parameters to not exceed the vehicle performance limitations 106.

In a least one aspect, the system 100 includes an input 120 that the pilots can use to interact with the vehicle operation instruction clearance application 108. For example, in addition to providing a graphical display indicating whether complying with an air traffic control instruction requires vehicle performance parameters vehicle operation parameters that exceed the vehicle performance limitations 106, the vehicle operation instruction clearance application 108 could also provide a graphical user interface that enables the pilots to transmit a responsive text-based message to the air traffic controller. The pilots could use the input 120 to interact with the graphical user interface. In various aspects, the input 120 could be part of the display 116. For example, the display 116 could be a touchscreen display, and the pilots could touch portions of the display 116 aligned with a displayed graphical user interface to provide inputs. In various other aspects, the display 116 could include various soft keys surrounding the display that the pilots could push to interact with the displayed graphical user interface. In various other aspects, the input could include a separate keyboard and/or cursor controller, such as a touchpad or trackball, to move a cursor icon on the display 116.

In various aspects, the computer processor 102 can be in communication with avionics and/or vehicle controls 118 for the aircraft. In the event the vehicle operation instruction clearance application 108 determines that the identified vehicle performance parameters do not exceed any of the vehicle performance limitations 106 (and, in certain aspects, the pilots have confirmed compliance with the air traffic control instructions), then the vehicle operation instruction clearance application 108 sends instructions to the avionics and/or vehicle controls 118, via the computer processor 102, of the aircraft to automatically comply with the air traffic control instruction. For example, an air traffic controller may instruct an aircraft to climb to announce to the 36,000 feet. In response, the vehicle operation instruction clearance application 108 could send a control signal to a mode control panel (MCP) or autopilot of the avionics and/or vehicle controls 118 to change an "altitude hold" setting to 36,000 feet. The vehicle operation instruction clearance application 108 could also send a control signal to the autopilot to change a "vertical speed" setting to a vertical speed that is within the vehicle performance limitations 106 to reach the target altitude of 36,000 feet.

Figure 2:
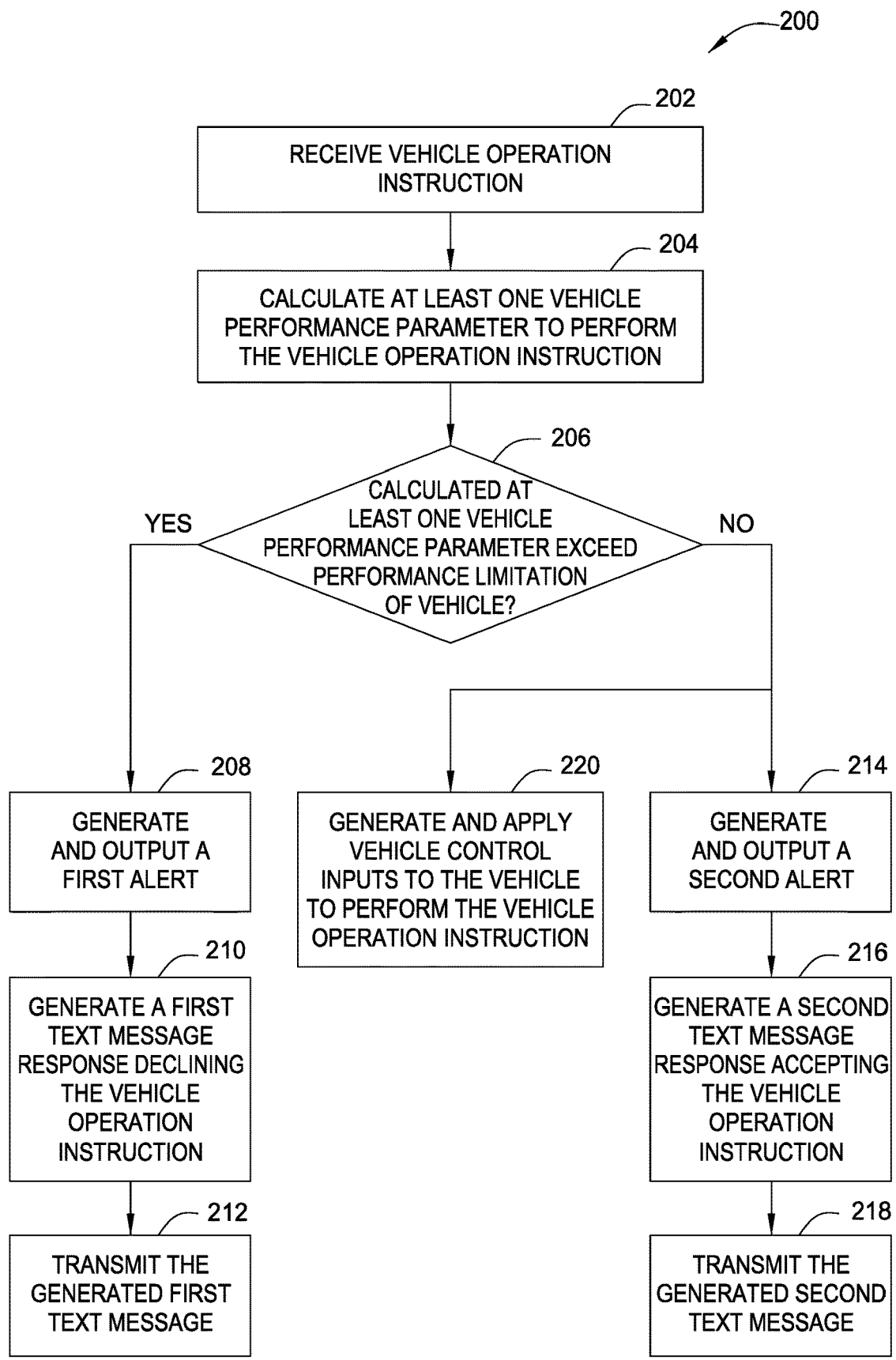
FIG. 2 is a flowchart of a method, according to one aspect, for providing text-based vehicle direction confirmation.

FIG. 2 is a flowchart for a method 200, according to at least one aspect, for automatically determining whether a vehicle, such as an aircraft, can properly perform a requested traffic control instruction. In block 202 of the method 200, a vehicle operation instruction is received from a vehicle traffic controller. For example, an air traffic controller or ground controller may provide instructions to an aircraft (i.e., the vehicle operation instruction is an aircraft operation instruction). In least one aspect, an air traffic controller may provide text-based instructions to the aircraft via a CPDLC system (e.g., the CPDLC module 110 illustrated in FIG. 1 and/or may provide spoken instructions to the aircraft via a radio transceiver (e.g., the radio transceiver 112 illustrated in FIG. 1), and a speech-to-text module (e.g., the speech-to-text module 114 illustrated in FIG. 1) can convert the spoken instructions into text-based instructions. In block 204, at least one vehicle performance parameter to perform the vehicle operation instruction is calculated for determined. Exemplary vehicle performance parameters for an aircraft (i.e., aircraft performance parameters) include an acceleration, a deceleration, a takeoff distance, an airspeed, a climb rate, an available takeoff length on an assigned takeoff runway, an available landing distance on an assigned landing runway, and an assigned altitude. For example, if an aircraft is instructed to climb to an altitude of 41,000 feet (12,497 meters), then a determined vehicle performance parameter to perform the vehicle operation instruction is 41,000 feet assigned altitude. As another example, if an aircraft is instructed to land on a particular runway, then a length of the runway is determined (e.g., by performing a lookup function in a data structure containing runway dimensions), and the determined length of the runway is a determined vehicle performance parameter to perform the vehicle instruction. As yet another example, if an aircraft is instructed to land on a particular runway and to hold short of a particular crossing taxiway, then a length of the runway to the taxiway is determined, and the determined length of the runway to the crossing taxiway is a determined vehicle performance parameter to perform the vehicle instruction.

In block 206 of the method 200, the calculated at least one vehicle performance parameter is compared to performance limitations of the vehicle to determine whether the at least one vehicle performance parameter exceeds a performance limitation of the vehicle. Continuing the examples in the preceding paragraph, the at least one vehicle performance parameter would exceed vehicle performance limitations if an aircraft instructed to climb to an altitude of 41,000 feet is limited to an altitude of 39,000 feet due to its weight. Similarly, an aircraft instructed to land on a 6,000 foot long (1,829 meter long) runway would exceed vehicle performance limitations if the aircraft requires 7,000 feet (2,134 meters) to land. Also, the aircraft may normally be able to land on a 6,000 foot long runway but may have problem with its spoilers, which temporarily extends the minimum landing distance requirement to 7,000 feet. In such a scenario, the landing instruction for a 6,000 foot long runway would exceed a temporary vehicle performance limitation.

In the event the at least one vehicle performance parameter exceeds a performance limitation of the vehicle in block 206, the method proceeds to block 208. In block 208, a first alert is generated and output. For example, the first alert may be a field on a computer display screen that is filled in red to indicate that at least one vehicle performance parameter exceeds performance limitations of the vehicle. Continuing the example from the preceding paragraphs, if an air traffic controller instructs an aircraft to climb to an altitude of 41,000 feet but the aircraft cannot climb above 39,000 feet based on its current weight, then the field on the display screen discussed above could be filled in red to indicate that the aircraft cannot comply with the air traffic control instruction. In block 210 of the method 200, a first text message response that declines the vehicle operation instruction is automatically generated. In block 212, the generated first text message is transmitted. In various aspects, the generated first text message is automatically transmitted. In various other aspects, the generated first text message is transmitted after receiving a prompt from the vehicle operator (e.g., a pilot) to do so.

Returning to block 206 of the method 200, in the event that the calculated at least one vehicle performance parameter does not exceed any performance limitation of the vehicle, then the method proceeds to block 214. In block 214, a second alert is generated and output. For example, the above described field on the computer display screen could be filled in green to indicate that the at least one vehicle performance parameter does not exceed performance limitations of the vehicle. Continuing the example from the preceding paragraphs, if the air traffic controller request that the aircraft climbs to 41,000 feet and the aircraft has used enough fuel (and thereby reduced its weight) such that the aircraft can climb to 41,000 feet, then the field on the display screen can be filled in green to indicate that the aircraft can comply with the air traffic control instruction. In block 216 of the method 200, a second text message response that accepts the vehicle operation instruction is automatically generated. In block 218, the generated second text message is transmitted. In various aspects, the generated second text message is automatically transmitted. In various other aspects, the generated second text message is transmitted after receiving a prompt from the vehicle operator.

Returning to block 206 of the method 200, in the event that the calculated at least one vehicle performance parameter does not exceed any performance limitations of the vehicle, in various aspects, the method can also proceed to block 220. In block 220, vehicle control inputs that cause the vehicle to automatically perform the vehicle operation instruction can be generated and applied. Continuing the example above, if an air traffic controller instructs an aircraft to climb to 41,000 feet and the aircraft is capable of climbing to 41,000 feet, then the method 200 (e.g., via the vehicle operation instruction clearance application 108) can provide control signals to an autopilot of the aircraft to change in altitude setting to 41,000 feet and/or to change a rate of climb setting such that the aircraft climbs to 41,000 feet. In various aspects, block 220 is performed automatically. In various other aspects, block 220 is performed after and/or in response to receiving a prompt from the vehicle operator to do so.

Figure 3:
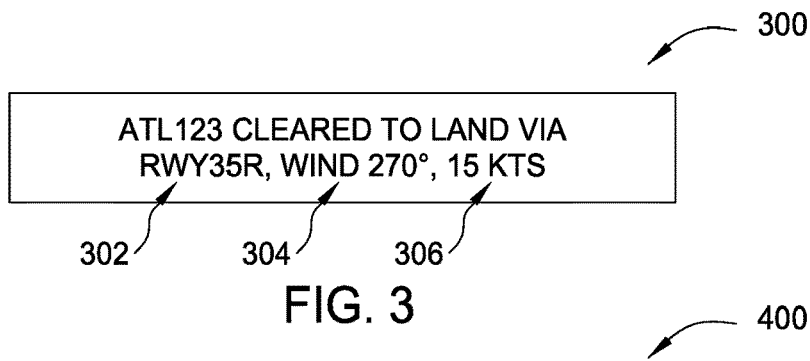
FIG. 3 illustrates an exemplary air traffic control instruction (e.g., vehicle direction) on the display screen.

FIG. 3 illustrates an exemplary text-based vehicle operation instruction 300 that may be provided by an air traffic controller to an aircraft. The exemplary text-based vehicle operation instruction 300 may be received via the CPDLC module or may be the result of a speech-to-text transformation performed on a spoken instruction, for example. The exemplary text-based vehicle operation instruction 300 is directed to a particular aircraft (i.e., ATL123) and directs the aircraft to land on runway 35R (indicated by reference number 302). The exemplary text-based vehicle operation instruction 300 further indicates that there is wind coming from the direction of 270° (indicated by reference number 304) at a speed of 15 knots (indicated by reference number 306). In various aspects, a system, such as the system 100 shown in FIG. 1, can look up a length of runway 35R (a vehicle performance parameter) and compare the length to a landing distance for the aircraft (a performance limitation) to ensure that there is sufficient runway to land. The system can also compare the wind direction and speed (a vehicle performance parameter) to crosswind limitations for the aircraft (a vehicle performance limitation) to ensure that the aircraft can perform an approach and landing in the crosswind conditions within parameters. In the event the aircraft can perform the landing within parameters, and the pilots are presented with an alert (e.g., the second alert in block 214 of the method 200 illustrated in FIG. 2) such as a green field on a computer display. The system can also automatically set avionics for the approach to runway 35R. For example, the system could tune a navigation radio for an instrument landing system for runway 35R. The system could also automatically load a standard terminal arrival route (STAR) associated with runway 35R into a flight plan. In the event the aircraft cannot perform the landing within parameters, the vehicle operator is presented with an alert (e.g., the first alert in block 208 of the method 200 illustrated in FIG. 2) such as a red field on a computer display.

Figure 4:
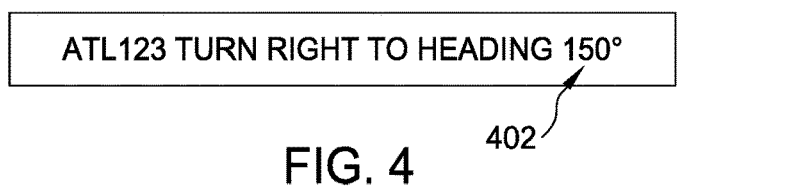
FIG. 4 illustrates another exemplary air traffic control instruction on a display screen.

FIG. 4 illustrates another exemplary text-based vehicle operation instruction 400 that could be provided by an air traffic controller to an aircraft. The exemplary text-based vehicle operation instruction 400 instructs the particular aircraft to turn right to a heading of 150° (indicated by reference number 402). In various aspects, such as the system 100 shown in FIG. 1, could compare a track of the aircraft along a heading of 150° to determine whether such a track poses a challenge to the aircraft. For example, a heading of 150° may turn the aircraft toward a thunderstorm that the aircraft may not be able to climb over. In such an exemplary circumstance, the pilots are presented with an alert (e.g., the first alert in block 208 of the method 200 illustrated in FIG. 2) such as a red field on a computer display. In some instances, a storm may not be challenging to fly through but the turbulence could be uncomfortable for passengers. In such instances, the pilots could be presented with another alert (e.g. a yellow-colored field) to indicate that the instruction can be performed but it may be undesirable to do so.

Figure 5:
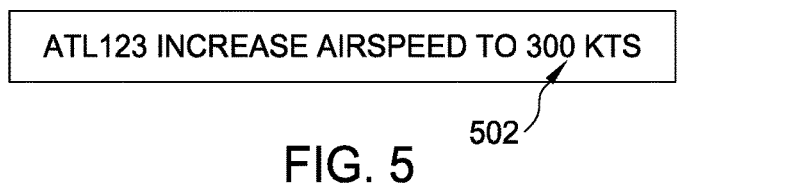
FIG. 5 illustrates another exemplary air traffic control instruction on a display screen.

FIG. 5 illustrates another exemplary text-based vehicle operation instruction 500 that may be provided by an air traffic controller to an aircraft. The exemplary text-based vehicle operation instruction 500 instructs the particular aircraft to increase its airspeed to 300 knots (indicated by reference number 502). In various aspects, the system, such as the system 100 shown in FIG. 1, could compare the instructed airspeed to a maximum airspeed for the aircraft. In the event the instructed airspeed of 300 knots exceeds in airspeed limitation of the aircraft, the pilots are presented with an alert (e.g., the first alert in block 208 of the method 200 illustrated in FIG. 2). In various circumstances, the aircraft may be subject to a temporary lower maximum speed. For example, if the aircraft is flying through turbulence, the aircraft may be limited to a maneuvering speed that is lower than a maximum airspeed. In such circumstances, the system compares the instructed airspeed to the temporary reduced maximum airspeed (e.g., the maneuvering speed).

Figure 6:
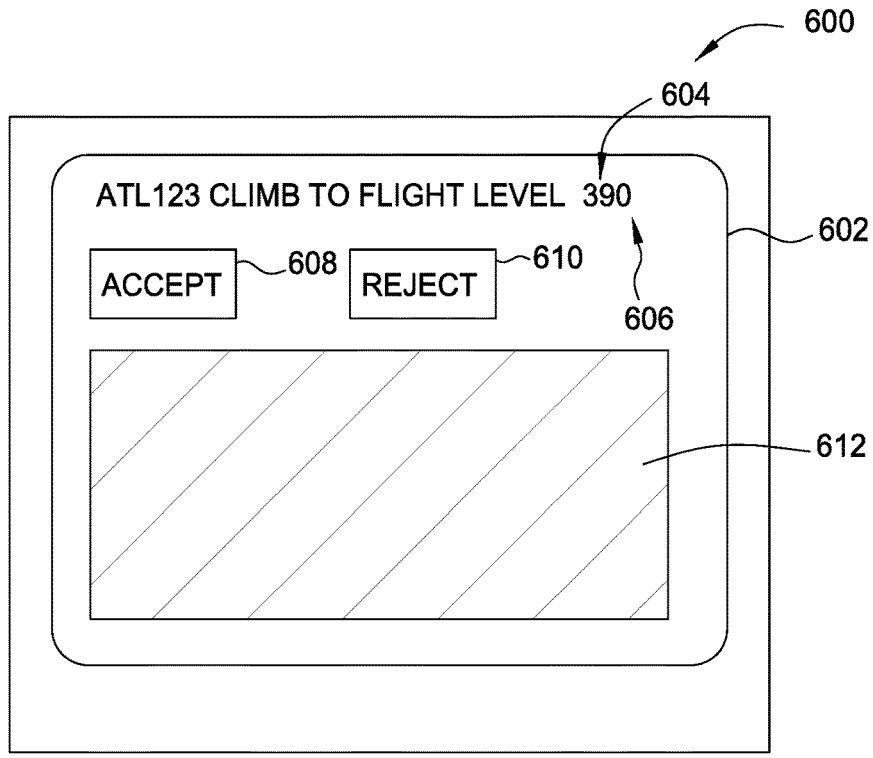
FIG. 6 illustrates an exemplary display, according to at least one aspect, that provides an exemplary air traffic control instruction, the graphical user interface enabling a user (e.g., a pilot) to accept or reject the air traffic control instruction, and a graphical field providing an indication of whether the air traffic control instruction can be followed.

FIG. 6 illustrates an exemplary CPDLC display 600 on board an aircraft. In various aspects, the CPDLC display 600 could be provided on a personal electronic device, such as a tablet computer. In various other aspects, the CPDLC display 600 could be provided on a display screen that is incorporated into the flight deck of the aircraft. For example, the CPDLC display 600 could be incorporated into an engine indication and crew alerting system (EICAS) display on the flight deck of an aircraft or into an electronic flight bag display screen on the flight deck. As another example, the CPDLC display 600 could be incorporated into a flight management computer (FMC) display on the flight deck. The CPDLC display 600 includes a display screen 602. The display screen 602 is illustrated as displaying an exemplary air traffic control instruction 604 that includes an instruction for the aircraft to climb to flight level 390 (i.e., 39,000 feet) (indicated by reference number 606). The display screen 602 also displays a field 612 that can be filled with one of several different colors depending on whether the air traffic control instruction 604 results in any vehicle performance parameters that exceed performance limitations of the aircraft. For example, if the aircraft is unable to climb to an altitude of 39,000 feet, then the field 612 could be filled with a red color. If the aircraft is able to climb to an altitude, then the field 612 could be filled with a green color. The display screen 602 also includes a graphical user interface that enables a user (e.g., a pilot) to accept or reject the air traffic control instruction 604. The illustrated graphical user interface includes an accept field 608 and a rejected field 610. In various aspects, the display screen 602 is a touchscreen display, and a pilot or other user could touch the regions of the display screen 602 occupied by the accept field 608 or the reject field 610 to accept or reject, respectively, the air traffic control instruction 604. In various other aspects, the pilot could use a touchpad to position a cursor over the accept field 608 or the reject field 610 to accept or reject, respectively, the air traffic control instruction 604. In response to the pilot accepting or rejecting the air traffic control instruction 604, an automatically generated response message could be transmitted to the air traffic controller.

Figure 7:
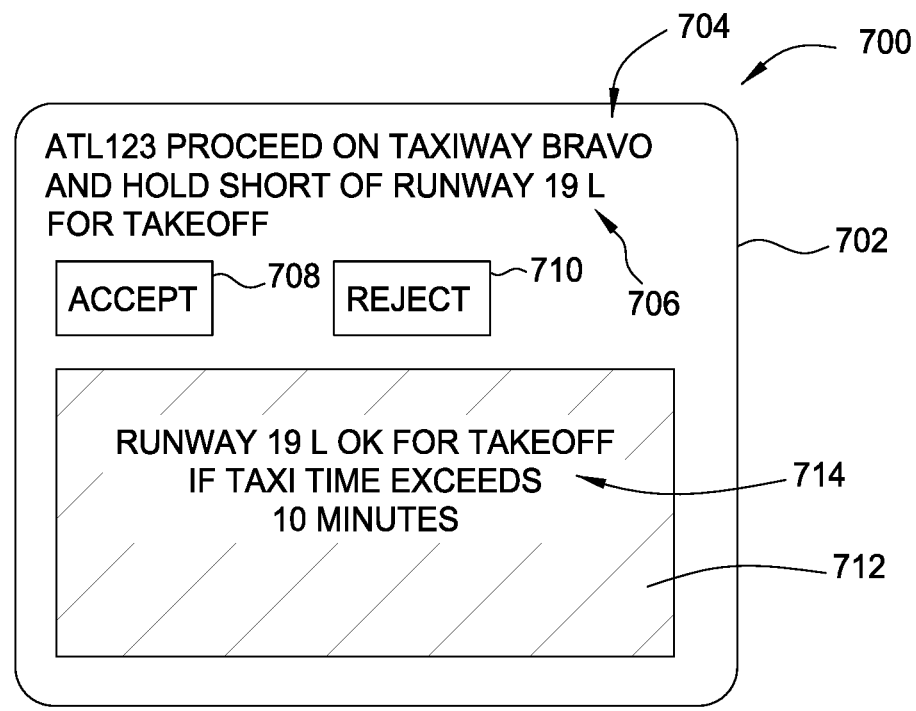
FIG. 7 illustrates an exemplary display, according to one aspect, that provides an exemplary air traffic control instruction, a graphical user interface enabling the user to accept or reject the air traffic control instruction, and the graphical field that provides conditions to be met for the air traffic control instruction to be followed.

FIG. 7 illustrates another exemplary CPDLC display on board an aircraft. In the exemplary scenario illustrated in FIG. 7, a display screen 700 displays a text-based air traffic control instruction 702 to an aircraft which instructs an aircraft to proceed on taxiway Bravo (indicated by reference number 704) and hold short of runway 19L for takeoff (indicated by reference number 706). The exemplary scenario depicted in FIG. 7 illustrates a situation in which the aircraft may conditionally accept the air traffic control instruction 702. For example, at the moment in time in which the aircraft receives the air traffic control instruction 702, the aircraft may weigh too much to be able to take off on runway 19L. However, ten minutes of taxiing may consume enough fuel that the aircraft weight drops to a level that the aircraft can take off from runway 19L. In such a scenario, a field 712 on the display screen 700 could be filled in yellow to indicate caution in accepting the air traffic control instruction 702. The field 712 could also include text 714 that describes the circumstances that must be satisfied to accept the clearance. Based on the exemplary scenario described above, the text 714 states "RUNWAY 19L OK FOR TAKEOFF IF TAXI TIME EXCEEDS 10 MINUTES." The display screen 700 includes an accept field 708 and a reject field 710 for a pilot to accept or reject, respectively, the air traffic control instruction 702. In response to the pilot accepting or rejecting the air traffic control instruction 702, an automatically generated response message could be transmitted to the air traffic controller.

In the above-described aspects, a vehicle operator such as a pilot is automatically and rapidly provided with guidance regarding whether received vehicle operating instructions can be properly performed within parameters. Such automatically-provided information can improve the vehicle operators' situational awareness and allow the vehicle operators to focus their attention on controlling the vehicle. Although the examples in the preceding paragraphs are largely directed toward aircraft operations, aspects described herein could be used with other types of vehicle operations, such as train operations and ship operations.

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects described herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects, other and further aspects described herein may be devised without departing from the basic scope thereof, and the scope thereof is determined by the claims that follow.

What is claimed is:

1. A computer-implemented method, comprising:
   during motive operation of a vehicle, wirelessly receiving a first vehicle operation instruction comprising a first instructed movement of the vehicle from a traffic controller, wherein the first vehicle operation instruction requires a compliance response to be transmitted to the traffic controller;
   prior to performing the first instructed movement, calculating at least a first vehicle performance parameter associated with performing the first instructed movement;
   comparing the first vehicle performance parameter associated with performing the first instructed movement with at least a first vehicle performance limitation of the vehicle to determine whether a performance of the first instructed movement exceeds performance limitations of the vehicle, wherein the performance of the first instructed movement exceeds the performance limitations of the vehicle at least when at least the first vehicle performance parameter exceeds at least the first vehicle performance limitation;
   generating and outputting a first alert to a vehicle operator upon determining that the first vehicle performance parameter would exceed the first vehicle performance limitation, wherein the first alert indicates the vehicle cannot comply with the first instructed movement; and
   transmitting the compliance response to the traffic controller indicating the vehicle cannot comply with the first instructed movement.

2. The computer-implemented method of claim 1, further comprising:
   responsive to determining that the first vehicle performance parameter exceeds the first vehicle performance limitation, generating and wirelessly transmitting a text message declining performance of the first instructed movement of the vehicle.

3. The computer-implemented method of claim 1, further comprising:
   receiving a second vehicle operation instruction comprising a second instructed movement of the vehicle;
   calculating at least a second vehicle performance parameter associated with performing the second instructed movement; and
   generating and outputting a second alert upon determining that the second vehicle performance parameter does not exceed any performance limitations of the vehicle.

4. The computer-implemented method of claim 3, wherein the vehicle comprises a computer display screen viewable by the vehicle operator,
   wherein outputting the first alert comprises displaying a red field on the computer display screen, and
   wherein outputting the second alert comprises displaying a green field on the computer display screen.

5. The computer-implemented method of claim 3, further comprising:
   responsive to determining that the second vehicle performance parameter does not exceed any performance limitations of the vehicle, generating and wirelessly transmitting a text message accepting performance of the second instructed movement of the vehicle.

6. The computer-implemented method of claim 3, further comprising:
   responsive to determining that the second vehicle performance parameter does not exceed any performance limitations of the vehicle:
      generating and displaying a prompt to the vehicle operator; and
      upon receiving an input from the vehicle operator:
         generating and wirelessly transmitting a text message accepting performance of the second instructed movement; and
         generating and applying vehicle control inputs to the vehicle to perform the second instructed movement.

7. A system for an aircraft, comprising:
   a controller pilot data link communications (CPDLC) module;
   a computer processor; and
   a computer memory including:
      a data structure including one or more performance limitations for the aircraft; and
      an application that is executable on the computer processor to:
         during motive operation of the aircraft, receive a first aircraft operation instruction from an air traffic controller via the CPDLC module, wherein the first aircraft operation instruction comprises a first instructed movement of the aircraft, wherein the first aircraft operation instruction requires a compliance response to be transmitted to the air traffic controller;
         prior to performing the first instructed movement, calculate at least a first aircraft performance parameter associated with performing the first instructed movement;

compare the first aircraft performance parameter associated with performing the first instructed movement with at least a first aircraft performance limitation of the one or more performance limitations for the aircraft to determine whether a performance of the first instructed movement exceeds performance limitations of the aircraft wherein the performance of the first instructed movement exceeds the performance limitations of the aircraft at least when at least the first aircraft performance parameter exceeds at least the first aircraft performance limitation;

generate and output a first alert to a computer display screen upon determining that the first aircraft performance parameter would exceed the first aircraft performance limitation, wherein the first alert indicates the aircraft cannot comply with the first instructed movement; and transmitting the compliance response to the air traffic controller indicating the aircraft cannot comply with the first instructed movement.

8. The system of claim 7, wherein the application is further executable to:

generate a first text message declining performance of the first instructed movement responsive to determining that the first aircraft performance parameter exceeds the first aircraft performance limitation; and wirelessly transmit the first text message via the CPDLC module.

9. The system of claim 7, wherein the application is further executable to:

receive a second aircraft operation instruction comprising a second instructed movement of the aircraft;

calculate at least a second aircraft performance parameter associated with performing the second instructed movement; and generate and output a second alert to the computer display screen upon determining that the second aircraft performance parameter does not exceed any of the one or more performance limitations.

10. The system of claim 9, wherein the computer display screen is viewable by a vehicle operator, wherein outputting the first alert comprises displaying a red field on the computer display screen, and wherein outputting the second alert comprises displaying a green field on the computer display screen.

11. The system of claim 9, wherein the application is further executable to:

generate a second text message accepting performance of the second instructed movement responsive to determining that the second aircraft performance parameter does not exceed any of the one or more performance limitations; and wirelessly transmit the second text message via the CPDLC module.

12. The system of claim 7, wherein the computer display screen is a computer display screen in a personal electronic device.

13. The system of claim 7, wherein the computer display screen is a display screen of an electronic flight bag system.

14. The system of claim 7, wherein the computer display screen is a display screen for an engine indicating and crew alerting system (EICAS).

15. The system of claim 9, wherein the application is further executable to:

responsive to determining that the second aircraft performance parameter does not exceed any performance limitations of the aircraft:

generate and display a prompt to an operator of the aircraft; and upon receiving an input from the operator:

generate and wirelessly transmit a text message accepting performance of the second instructed movement via the CPDLC module; and generate and transmit vehicle control inputs to avionics of the aircraft to perform the second instructed movement.

16. A computer program product for clearing vehicle operation instructions, the computer program product comprising:

a computer-readable storage medium having computer-readable program code embodied therewith, the computer-readable program code executable by one or more computer processors to:

during motive operation of a vehicle, wirelessly receive a first vehicle operation instruction, from an external vehicle controller, comprising a first instructed movement of the vehicle from a traffic controller, wherein first vehicle operation instruction requires a compliance response to be transmitted to the traffic controller;

prior to performing the first instructed movement, calculate at least a first vehicle performance parameter associated with performing the first instructed movement;

compare the first vehicle performance parameter associated with performing the first instructed movement with at least a first vehicle performance limitation of the vehicle to determine whether a performance of the first instructed movement exceeds performance limitations of the vehicle, wherein the performance of the first instructed movement exceeds the performance limitations of the vehicle at least when at least the first vehicle performance parameter exceeds at least the first vehicle performance limitation;

generate and output a first alert to a vehicle operator upon determining that the first vehicle performance parameter would exceed the first vehicle performance limitation; wherein the first alert indicates the vehicle cannot comply with the first instructed movement; and transmitting the compliance response to the traffic controller indicating the vehicle cannot comply with the first instructed movement.

17. The computer program product of claim 16, wherein the computer-readable program code is further executable to:

responsive to determining that the first vehicle performance parameter exceeds the first vehicle performance limitation, generate and wirelessly transmit a text message declining performance of the first instructed movement of the vehicle.

18. The computer program product of claim 16, wherein the computer-readable program code is further executable to:

receive a second vehicle operation instruction comprising a second instructed movement of the vehicle;

calculate at least a second vehicle performance parameter associated with performing the second instructed movement; and generate and output a second alert upon determining that the second vehicle performance parameter does not exceed any performance limitations of the vehicle.

19. The computer program product of claim 18, wherein outputting the first alert comprises displaying a red field on a computer display screen of the vehicle, and
wherein outputting the second alert comprises displaying a green field on the computer display screen.

20. The computer program product of claim 18, wherein the computer-readable program code is further executable to:
responsive to determining that the second vehicle performance parameter does not exceed any performance limitations of the vehicle, generate and wirelessly transmit a text message accepting performance of the second instructed movement of the vehicle.

\* \* \* \* \*